US008356705B2

(12) United States Patent
Guerra

(10) Patent No.: US 8,356,705 B2
(45) Date of Patent: Jan. 22, 2013

(54) HANDLING DEVICE FOR DRIVING, IMMERSING, REMOVING, OR ROTATING MOTOR VEHICLE BODYWORKS INTO OR FROM A PROCESSING BASIN OR BASINS

(75) Inventors: Giancarlo Guerra, Milan (IT); Fabio Guerra, legal representative, Milan (IT)

(73) Assignee: Geico S.p.A., Milan (IT)

( * ) Notice: Subject to any disclaimer, the term of this patent is extended or adjusted under 35 U.S.C. 154(b) by 179 days.

(21) Appl. No.: 12/735,285

(22) PCT Filed: Dec. 30, 2008

(86) PCT No.: PCT/IT2008/000819
§ 371 (c)(1),
(2), (4) Date: Feb. 1, 2011

(87) PCT Pub. No.: WO2009/087700
PCT Pub. Date: Jul. 16, 2009

(65) Prior Publication Data
US 2011/0176894 A1 Jul. 21, 2011

(30) Foreign Application Priority Data
Jan. 10, 2008 (IT) .............................. MI2008A0037

(51) Int. Cl.
*B65G 47/244* (2006.01)
*B62D 65/18* (2006.01)
*B65G 47/248* (2006.01)

(52) U.S. Cl. .................. 198/346.3; 198/346; 198/463.3; 198/465.4; 118/425; 118/426; 134/70; 134/124

(58) Field of Classification Search ................. 198/346, 198/346.3, 315, 377.01, 377.02, 465.3, 465.4, 198/468.01, 468.6, 406; 118/423, 425, 428; 134/70, 124
See application file for complete search history.

(56) References Cited

U.S. PATENT DOCUMENTS

| 4,462,315 | A | * | 7/1984 | Wakabayashi | ............. 104/172.4 |
|---|---|---|---|---|---|
| 5,364,469 | A | * | 11/1994 | Wakabayashi | ................ 118/423 |
| 5,651,822 | A | * | 7/1997 | Heckmann | .................... 118/426 |
| 5,972,112 | A | * | 10/1999 | Wood et al. | .................... 118/423 |
| 6,966,431 | B2 | * | 11/2005 | Jaynes et al. | .................. 198/817 |
| 6,991,064 | B2 | * | 1/2006 | Ehrenleitner | ................. 182/141 |
| 7,134,541 | B2 | * | 11/2006 | Matsubara et al. | ...... 198/468.01 |
| 7,497,321 | B2 | * | 3/2009 | Matsubara et al. | ........ 198/465.4 |
| 2003/0116179 | A1 | * | 6/2003 | Jarvis et al. | .................. 134/95.3 |
| 2005/0025612 | A1 | | 2/2005 | Ehrenleitner | |
| 2010/0086384 | A1 | | 4/2010 | Guerra | |

FOREIGN PATENT DOCUMENTS
WO    WO-2008/126108 A1    10/2008

* cited by examiner

*Primary Examiner* — Mark A Deuble
(74) *Attorney, Agent, or Firm* — Harness, Dickey & Pierce, P.L.C.

(57) ABSTRACT

An improved handling device for driving, immersing/removing and rotating motor vehicle, truck cabin, van and metal article vessel bodyworks into/from processing basins is characterized in that said device comprises a sliding frame designed for sliding on sliding rails, driven by one or two driving chains, and supporting a pair of arms bearing, at their free end portion, a swinging platform, in turn adapted to bear a skid for supporting a bodywork, the sliding frame comprising one or two winch assemblies driving respective pulleys thereon are entrained ropes, belts, chains or the like, and being associated with a respective arm at a swinging shaft, said sliding frame comprising moreover two rack assemblies, therealong slide respective end portions of the arms coupled to the frame, said swinging platform being driven by a chain driving system.

20 Claims, 3 Drawing Sheets

HANDLING DEVICE FOR DRIVING, IMMERSING, REMOVING, OR ROTATING MOTOR VEHICLE BODYWORKS INTO OR FROM A PROCESSING BASIN OR BASINS

CROSS-REFERENCE TO RELATED APPLICATIONS

This application is a national stage entry from International Application No. PCT/IT2008/000819, filed on Dec. 30, 2008, in the Receiving Office of the World Intellectual Property Organization, which claims priority from Italian Patent Application No. MI2008A000037, filed on Jan. 10, 2008, in the Italian Patent and Trademark Office, the entire contents of both of which are incorporated herein by reference.

BACKGROUND OF THE INVENTION

The present invention relates to an improved handling device for driving, immersing/removing and rotating motor vehicle, truck cabin, van and metal article vessel bodyworks into/from processing basins.

The device according to the invention has been specifically designed, in particular, for driving motor vehicle bodyworks, for subjecting said motor vehicle bodyworks to any desired processing operations.

As is known, bodyworks of motor vehicles in general must be subjected to several processing operations, comprising pre-processing steps, cataphoresis steps, and yet other operating steps for applying sealing materials, masks and PVC finishing elements.

During the above mentioned processing operations, each bodywork, including a related handling skid, must be loaded on the so-called "arch" assemblies on roller tables, to be coupled to a swinging table of the processing device.

In particular, the latter can be driven by a driving chain, provided with a plurality of latching assemblies distributed with a desired pitch along the driving chain.

Thus, by using one or two suitable driving or carrying chains, it is possible to entrain a plurality of processing devices of the above mentioned type, which are held either with a fixed or a variable pitch.

SUMMARY OF THE INVENTION

The aim of the present invention is to provide such a handling device which is adapted to immerse, rotate and withdraw the motor vehicle bodyworks into/from their processing basins.

More specifically, at said processing basins, the motor vehicle bodyworks are either partially or fully rotated to allow any air bubbles present in the motor vehicle bodyworks immersed in the processing basins, to be removed therefrom.

The inventive device, moreover, allows to perform a lot of other processing operations, such as sealing, masking operations, as well as PVC layer applying operations.

The above mentioned operating steps are carried out at outer stations, that is outside the processing basins, to allow several operators, arranged on an underlying bearing platform, to operate at an ergonomic position, that is at a proper height and width and proper inclination.

For providing the above mentioned results, the device must be specifically adapted to lower to a proper level the bodywork bearing arms.

Moreover, the device must also allow to properly vertically arrange the motor vehicle bodyworks, to reduce the accumulating pitch thereof.

Thus, it is possible to reduce as desired the pitch or spacing between two following bodyworks, during a storing and transferring operation.

According to one aspect of the present invention, the above objects, as well as yet other objects, which will become more apparent hereinafter, are achieved by an improved handling device for driving, immersing/removing and rotating motor vehicle, truck cabin, van and metal article vessel bodyworks into/from processing basins, characterized in that said device comprises a sliding frame, adapted to slide on sliding rails, said sliding frame being driven either by one or two driving chains, and supporting a pair of arms bearing, at a free end portion thereof, a swinging platform bearing a motor vehicle bodywork supporting skid, said sliding frame comprising one or two winch assemblies operating respective pulleys for entraining thereon ropes, belts, chains or the like and being associated with a respective arm at a swinging shaft therefor, said sliding frame further comprising two racks therealong slide end portions of the respective arms coupled to said frame, said swinging platform being rotatively driven by a chain driving system.

BRIEF DESCRIPTION OF THE DRAWINGS

Further characteristics and advantages of the present invention will become more apparent hereinafter from the following detailed disclosure of a preferred, though not exclusive, embodiment of the invention, which is illustrated, by way of an indicative, but not limitative example, in the accompanying drawings, where.

DESCRIPTION OF THE PREFERRED EMBODIMENTS

Figure 1:
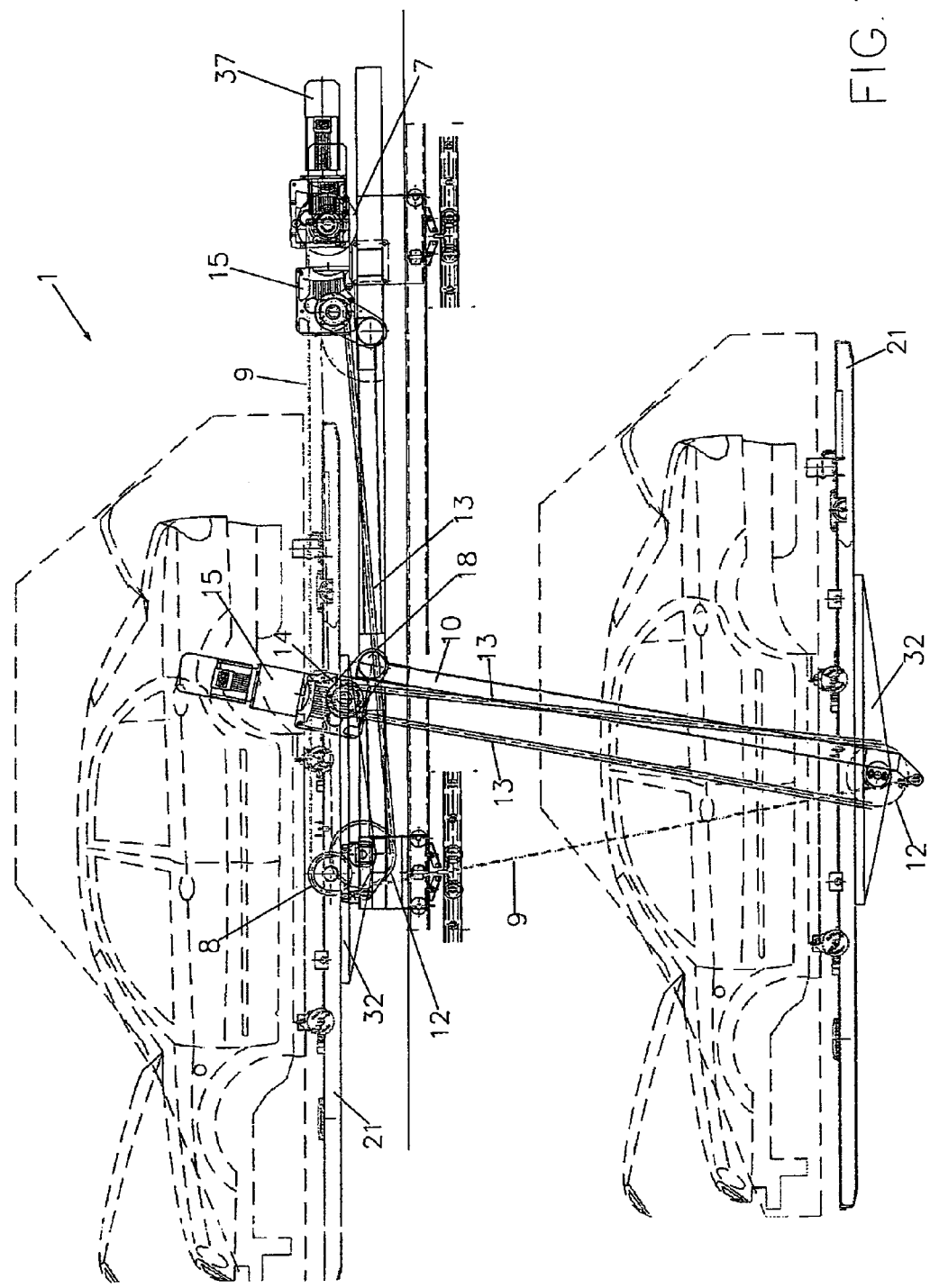
FIG. 1 is an elevation view of the improved handling device according to the present invention.
Figure 2:
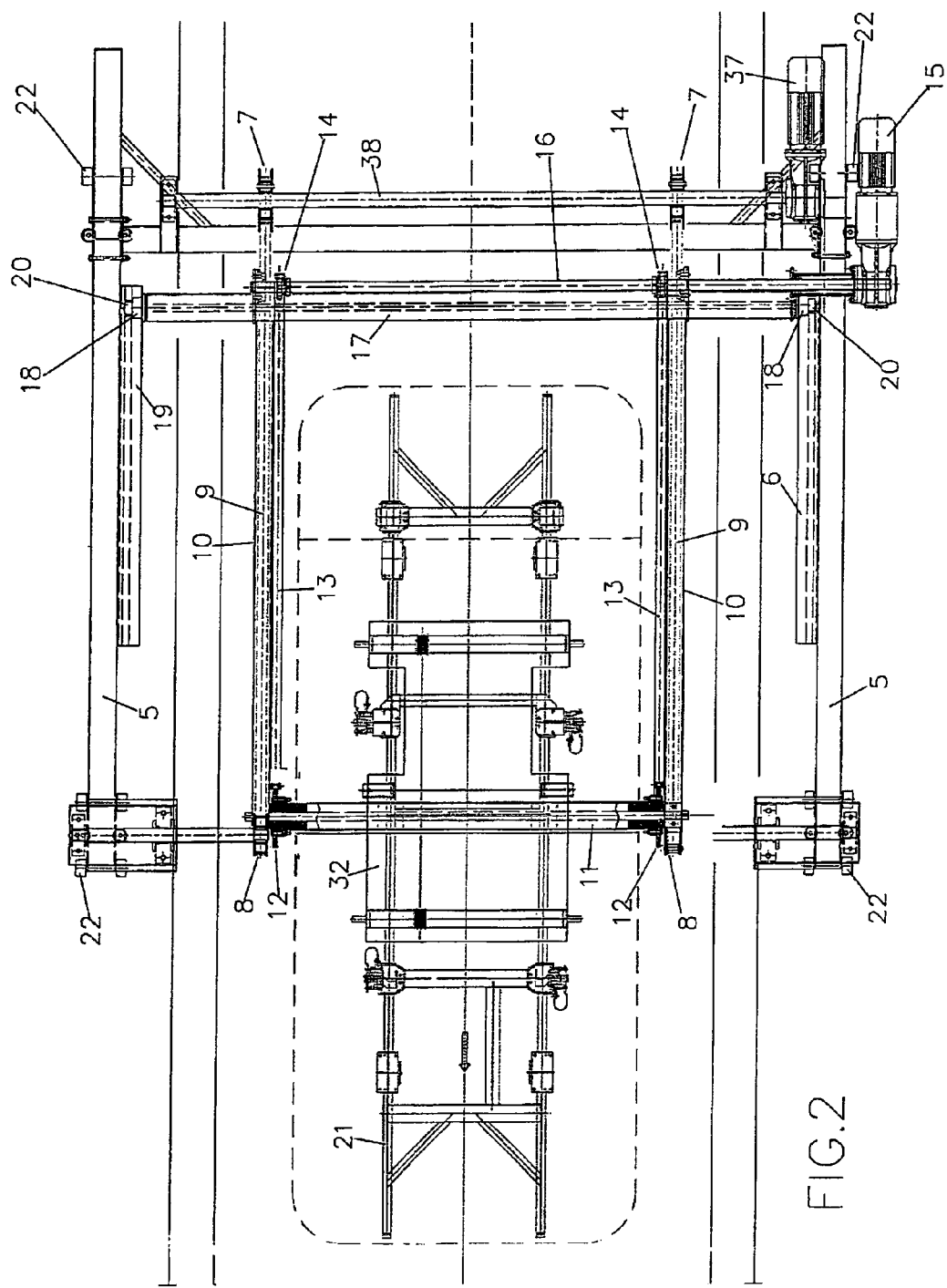
FIG. 2 is a top plan view of the improved handling device according to the present invention.
Figure 3:
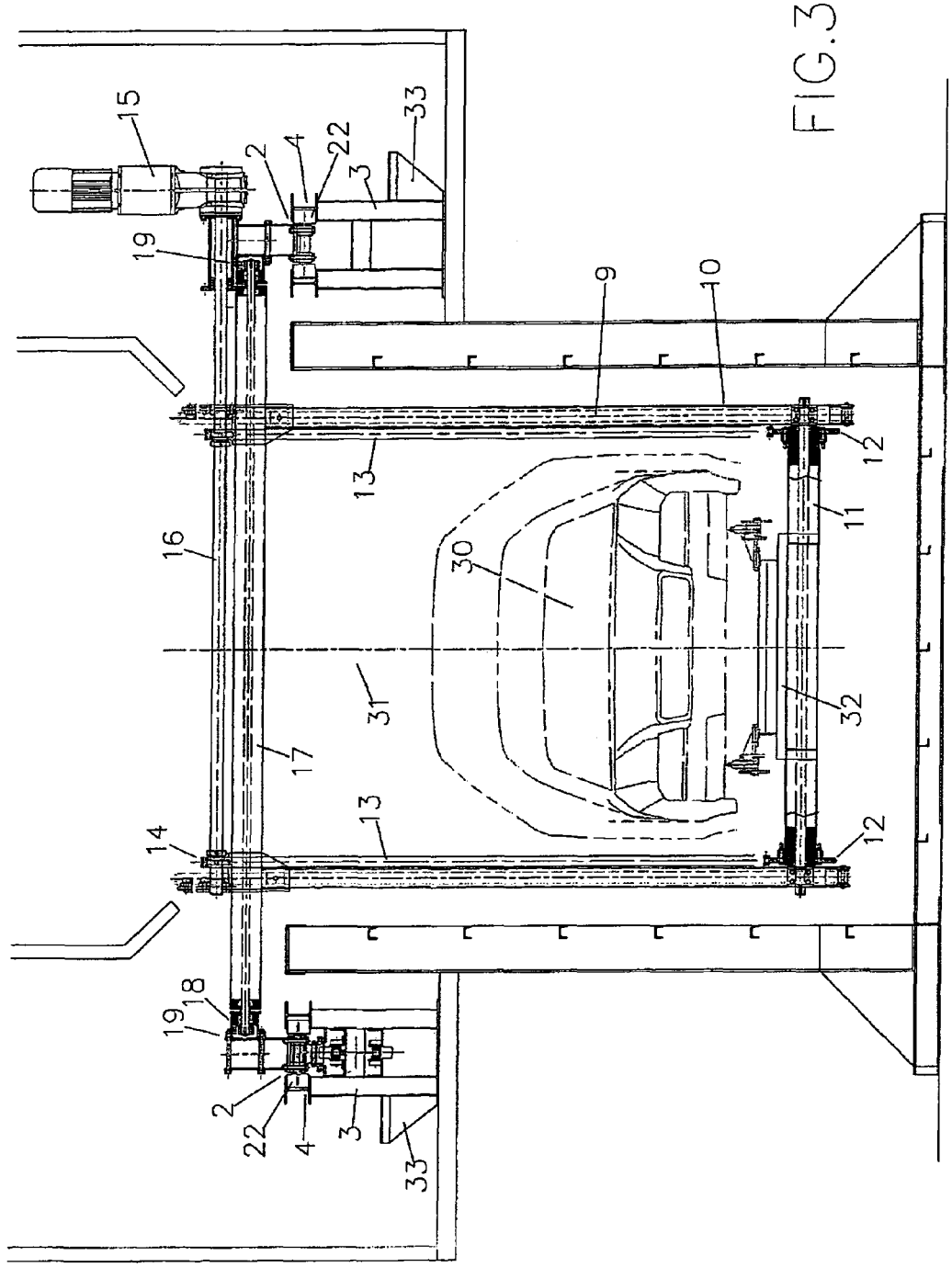
FIG. 3 is a front view of the improved handling device according to the present invention.

With reference to the number references of the above mentioned figures, the improved handling device according to the present invention, which has been generally indicated by the reference number 1, comprises wheels 22, preferably of a double-wheel type, sliding on guides or rails having an anti-tilting type of contour 2, applied to the support 3 of the rails 4.

The rail support 3 comprises moreover a walking-on step 33 for aiding an operator to project himself to the processing basin.

The above mentioned wheels 22 support a U-shape frame 5 in turn supporting two rack assemblies 6 and one or two winch assemblies 7, being driven by a motor geared unit 37 through a driving shaft 38.

Said winch assemblies 7, by properly rotatively driving belt or rope elements are thus adapted to rotatively drive the corresponding pulleys 8, thereon are entrained suitable ropes, chains or preferably belts 9, for raising a pair of arms or arch assemblies 10.

Said arch assemblies 10, at a top end portion thereof, are adapted to horizontally slide on the rack assemblies 6, to provide a reciprocating rectilinear movement.

To that end, said arch assemblies 10 are associated to a rotary axis 17, supporting, at its end portions, sliding wheels 18, engaged in respective top sliding guides 19.

At said sliding wheels 18, gear wheels 20, for engaging the respective rack assemblies 6 are provided.

At the other end portions thereof, said arch assemblies 10 further support, at the attachment of the belts 9, a rotary shaft 11, coupled to a swinging platform 32, which can rotate through variable rotary angles, due to the rotary movement transmitted to the shaft 11 by a pair of gear wheels or ring gears 12, one for each end portion of said shaft 11.

Each said gear wheel 12 is driven by a respective driving chain 13, which is controlled by a controlling pinion 14.

The two pinions 14, in particular, are keyed on a transmission or driving shaft 16, which is in turn driven by a motor geared unit 15.

On the swinging platform 32, coupled to the shaft 11, is arranged a supporting skid 21 which supports a motor vehicle bodywork 30 to be processed in the processing basin 31.

Thus, as the ropes or belts 9 are slidably driven in their respective pulleys 8 by operating the winch assemblies 7 in turn driven by the motor geared unit 37, the arch assemblies 10, and accordingly the swinging platform 32 coupled to the rotary shaft 11 which, together with said swinging platform 32, supports said skid 21, are lowered.

During this handling the rack assemblies 6 allow the arch assemblies 10 to be held in a parallel mutual relationship.

In particular, the shaft of the swinging platform 32 is rotatively driven by the transmission of driving system comprising the double chain transmission 13, and the motor geared unit 15.

The thus made device allows to provide handling operations within a very broad range: for example, the bodywork 30 can be arranged with a vertical arrangement, and it may also be arranged in a tilted orientation.

The device according to the present invention has a very small height.

Accordingly, it can be conveyed on a bottom driving chain portion, by possibly passing under the processing basins, thereby it may be again conveyed to the start of the system.

The chain transmission or drive for rotatively driving the shaft of the swinging platform is very reliable and of long duration, and can be easily serviced.

It has been found that the invention fully achieves the intended aim and objects.

In fact, the invention has provided a device for handling bodyworks 30 of motor vehicles, vans, truck cabs and metal article vessels, which can be easily serviced and operates in a very reliable and functional manner.

Moreover, the device according to the present invention allows to greatly reduce the space occupied by the bodyworks 30, both during the handling or driving operation proper and during the immersion operating step.

Thus, it is possible to use small size processing basins, with a consequent reduction of the processing fluids being consumed.

Furthermore, it should be pointed out that the skid and related bodywork assembly, as shown in the bottom part of FIG. 1, can be loaded or unloaded onto/from the swinging platform 32 from this position.

If the above mentioned assembly is loaded with a following return movement of the arch assemblies 10 to a horizontal position, it is possible to operate the device as an elevator for a proper starting of the necessary processing operations.

If, on the other hand, the above mentioned assembly is unloaded, the inventive device will operate as a lowering device for delivering the fully processed bodyworks.

In practicing the invention, the used materials, as well as the contingent size and shapes, can be any, depending on requirements.

The invention claimed is:

1. A handling device for driving, immersing, removing, or rotating motor vehicle bodyworks into or from a processing basin or basins, the handling device comprising:
   a sliding frame;
   sliding rails;
   a pair of arms operatively connected by a connecting member;
   first and second shafts;
   a platform;
   a supporting skid;
   a first motor geared unit;
   pinions keyed to the first shaft;
   first gear wheels at end portions of the second shaft; and
   driving chains operatively connecting the pinions to the first gear wheels;
   wherein the sliding frame is configured to slide on the sliding rails,
   wherein the sliding frame supports the pair of arms,
   wherein the pair of arms bear the second shaft at first end portions of the pair of arms,
   wherein the second shaft bears the platform,
   wherein the platform bears the supporting skid,
   wherein the first motor geared unit rotatively drives the platform via the first shaft, the pinions, the driving chains, the first gear wheels, and the second shaft,
   wherein the sliding frame comprises:
     a winch assembly or two winch assemblies; and
     two racks; and
   wherein the winch assembly operates a respective pulley or the winch assemblies operate respective pulleys in order to slide the pair of arms operatively connected by the connecting member along the racks.

2. The handling device of claim 1, wherein the sliding frame further comprises:
   a plurality of sliding wheels sliding in anti-tilting guides;
   wherein the wheels or guides bear on corresponding supporting elements.

3. The handling device of claim 1, wherein the rails are supported by a rail supporting assembly, and
   wherein the rail supporting assembly includes a step configured to allow an operator to walk on the step.

4. The handling device of claim 1, wherein the sliding frame has a U-shape.

5. The handling device of claim 1, wherein the pair of arms operatively connected by the connecting member slide along the racks in order to provide rectilinear reciprocating movement.

6. The handling device of claim 1, wherein the pair of arms are associated with a rotary axis having, at end portions of the rotary axis, a plurality of sliding wheels engaged in respective top guides, and
   wherein at the sliding wheels are arranged second gear wheels designed for meshing with the racks.

7. The handling device of claim 1, wherein the supporting skid supports a respective bodywork to be processed in the processing basin or basins.

8. The handling device of claim 1, further comprising:
   a second motor geared unit; and
   a driving member;
   wherein the winch assembly, driven by the second motor geared unit, is configured to lower or raise the pair of arms via the driving member.

9. The handling device of claim 1, wherein the racks are designed so as to cause the pair of arms to be held in a mutually parallel relationship as the pair of arms are driven.

10. The handling device of claim 1, wherein the supporting skid is configured to operate as a bodywork elevator.

11. The handling device of claim 1, wherein the sliding frame further comprises:
- a plurality of double sliding wheels sliding in anti-tilting guides;
- wherein the wheels or guides bear on corresponding supporting elements.

12. The handling device of claim 1, further comprising:
a second motor geared unit; and a pair of driving members;

wherein the winch assemblies, driven by the second motor geared unit, are configured to lower or raise the pair of arms via the pair of driving members.

13. The handling device of claim 1, further comprising:
a second motor geared unit; and a third shaft.

14. The handling device of claim 13, wherein the second motor geared unit raises or lowers the platform via the third shaft, the winch assembly or assemblies, and the respective pulley or pulleys.

15. The handling device of claim 1, wherein the supporting skid is configured to operate as a bodywork lowering device or a bodywork raising device.

16. The handling device of claim 1, wherein the winch assembly includes a belt, chain, or rope, or
- wherein the winch assemblies include belts, chains, or ropes.

17. The handling device of claim 1, wherein the first and second shafts are parallel to each other.

18. The handling device of claim 13, wherein the first and third shafts are parallel to each other.

19. The handling device of claim 13, wherein the second and third shafts are parallel to each other.

20. The handling device of claim 13, wherein the first, second, and third shafts are parallel to each other.

* * * * *